United States Patent [19]
Watkins

[11] Patent Number: 5,832,302
[45] Date of Patent: Nov. 3, 1998

[54] DUAL ADDER BURST CONTROL GOVERNOR TO SIGNAL WHEN A DATA BURST IS CLOSE TO COMPLETION

[75] Inventor: John Watkins, Sunnyvale, Calif.

[73] Assignee: Sun Microsystems, Inc., Mountain View, Calif.

[21] Appl. No.: 673,057

[22] Filed: Jul. 1, 1996

[51] Int. Cl.⁶ .................................................. G06F 12/00
[52] U.S. Cl. ...................................... 395/855; 364/258.1
[58] Field of Search .................................. 395/306, 309, 395/853, 854, 855

[56] References Cited

U.S. PATENT DOCUMENTS 4,759,014  7/1988  Decker et al. ........................... 370/503
5,539,891  7/1996  Childers et al. ............................ 711/5
5,619,647  4/1997  Jardine .................................. 395/200.7
5,640,518  6/1997  Muhich et al. .......................... 395/290

*Primary Examiner*—Lance Leonard Barry, Esq.
*Attorney, Agent, or Firm*—Blakely Sokoloff Taylor & Zafman

[57] ABSTRACT

An improved apparatus and method for monitoring and controlling when a data phase in a burst transmission of data is about to end. The apparatus described interleaves dual adder circuits such that each dual adder circuit has more time to process incoming data. Distribution of the processing allows slower, lower cost components to be used in high speed applications. The described apparatus and method are particularly useful in peripheral component interconnect applications.

18 Claims, 8 Drawing Sheets

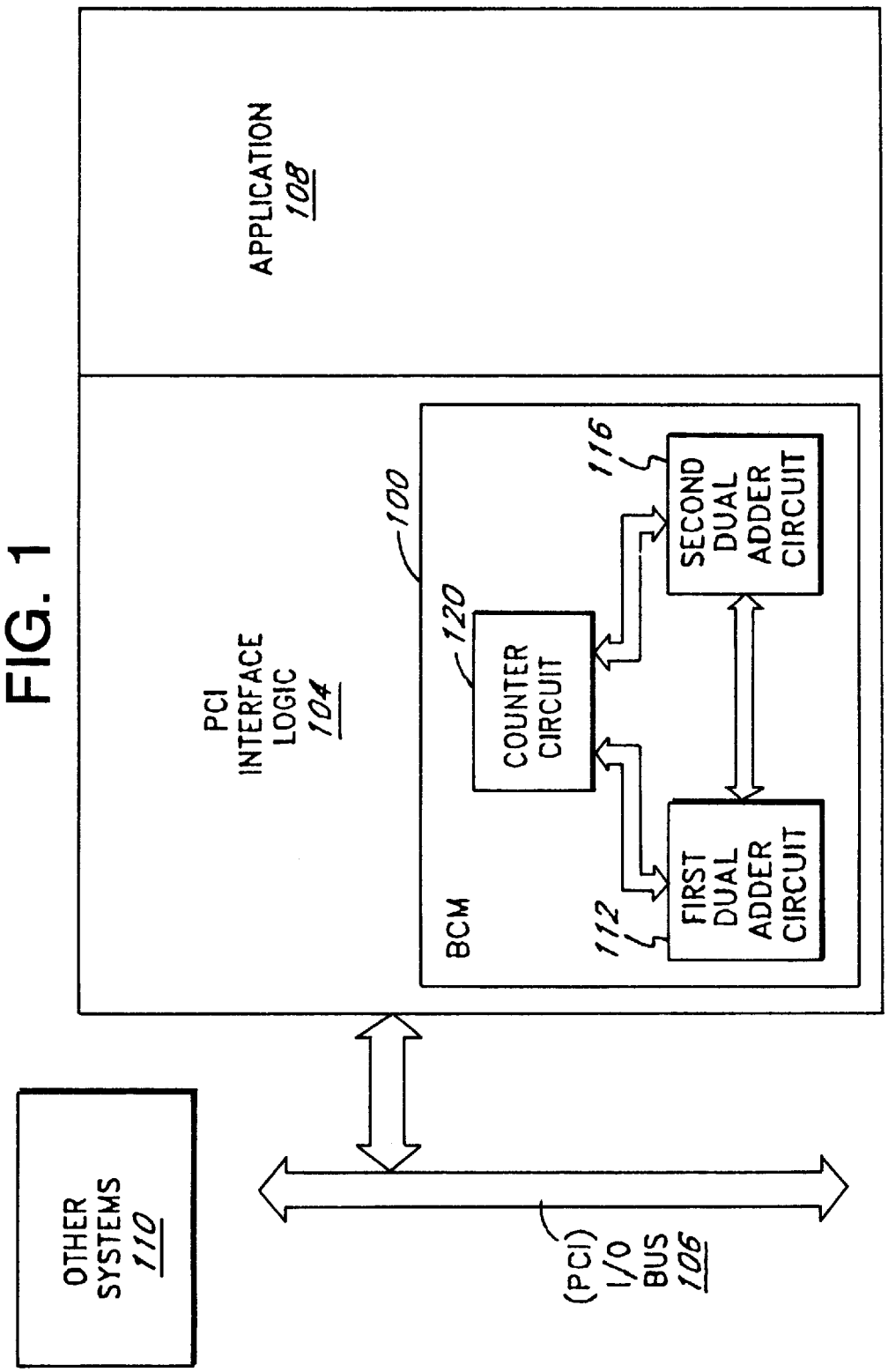

DUAL ADDER BURST CONTROL GOVERNOR TO SIGNAL WHEN A DATA BURST IS CLOSE TO COMPLETION

BACKGROUND OF THE INVENTION

1. Field of the Invention

The present invention relates to data transmission. Specifically, the following discloses a method and circuit for issuing a signal which indicates that all of the information in a burst transmission of data has been sent.

2. Description of Related Art

Data busses are used to transfer data between components in a computer system. A number of different standards for these buses have been implemented to facilitate and standardize the protocols used in the transmission and reception of data over these buses. Such standardization allows components from different manufacturers to communicate.

One of those standards, the Peripheral Component Interconnect, PCI, standard has gained widespread popularity. One feature of the PCI standard is that it facilitates high speed data transmission using burst transfers. A burst transfer comprises an address phase and one or more data phases. In a burst access, up to 32 bits or 64 bits can be transferred each clock depending upon if a 32 or 64 bit transfer cycle is in progress and what byte enables are asserted.

PCI data transfers are controlled with three fundamental signals. A FRAME# signal, controlled by a master being the source of the data indicates the beginning and end of a burst transfer. An IRDY# signal indicates when the master is ready to transfer data and a TRDY# signal indicates when the target (the destination for the data) is ready to receive the data.

The PCI interface is in an idle state when both FRAME# and IRDY# signals are deasserted. The first clock edge on which FRAME# is asserted starts the address phase. The next clock edge begins the first of one or more data phases. During the data phase, data is transferred between master (source) and target (destination) on each clock edge for which IRDY# and TRDY# are asserted. Wait cycles may be inserted in a data phase by either the master (source) or the target (destination) when either the IRDY# signal or the TRDY# signal is deasserted.

The source of the data is required to assert its IRDY# or TRDY# signal unconditionally, when data is valid (IRDY# if a master, TRDY# if a target). The target may delay the assertion of its IRDY# or TRDY# when it is not ready to accept data. Data can only be transferred when IRDY# and TRDY# are both asserted on the same rising clock edge. Once the master has asserted IRDY#, it cannot change IRDY# or FRAME# until the current data phase is completed regardless of the state of TRDY#. Once a target has asserted TRDY#, it cannot change TRDY#, until the current data phase is completed. Thus, neither the master nor the target can change the start and end of a data transfer until a data phase is completed. (A data phase completes when IRDY# and TRDY# or STOP# (which indicates the assertion of a disconnect). Data may or may not transfer depending on the state of TRDY#.

The target can interrupt the data burst with a disconnect signal. An assertion of a disconnect results in the master terminating the access, and getting off the bus. The master may resume the access later. The master might wish to issue 64-bit transfers but the target must agree to this through the protocol. The target may initially agree to a 64-bit transfer at the beginning of a burst but only allow 32-bit transfers after a disconnect when the master returns to complete the transfer. Multiple disconnects can occur during a burst with the 32/64 bit negotiations taking place at the beginning of each resumed access.

At such time as the master intends to complete only one more data transfer (which could be immediately after the address phase), FRAME# is deasserted and IRDY# is asserted or remains asserted indicating the master is ready. After the target indicates that it is ready to complete the final data transfer (TRDY# is asserted), the PCI interface logic returns to the idle state with both FRAME# and IRDY# deasserted. Additional details of the operation of a PCI circuit are contained in sections 3.3.1 to section 3.3.3 of the *PCI Local Bus Specifications* available from PCI Special Interest Group, P.O. Box 14070, Portland, Oreg. 97214, (800) 433-5177 (U.S.), (503) 797-4207 (International), and (503) 234-6792 (FAX). The contents of that document are hereby incorporated by reference.

A burst control circuit is used to handle the incoming data transfer signals from the target (e.g. TRDY#, DELSEV#, or STOP#) and to generate control signals (e.g. FRAME#, IRDY#) through the end of a data transfer. In particular, for the master to conduct burst transfers in compliance with the protocol, FRAME# is asserted until the data phase immediately preceding the last data phase needed to complete the burst access. A vital part of the master's control logic is a mechanism which keeps track of how much of the burst transfer has been completed and determines when FRAME# is to be deasserted.

In order to keep up with the higher data transfer rates required by high speed busses, such as the 66 MHz PCI standard data transfer rate, traditional circuits have turned to high speed components to track how much of the burst transfer has been completed and determine when FRAME# is to be deasserted. Such high speed components or the technologies providing them are expensive. For example, high speed adders needed to work in the convention burst control approach add substantial cost to other PCI interface designs. Thus, a lower cost method of handling high speed data transfer is desirable.

SUMMARY OF THE INVENTION

An improved method and apparatus for tracking and controlling data in a PCI data burst transmission is disclosed.

The described invention is a burst control monitoring method and apparatus which tracks how many data phases remain to be transferred in a data burst transmission and issues an appropriate signal when transmission is about to the completed. In order to handle high clock speeds without having to employ more expensive technologies or circuitry, the invention divides the tracking circuitry into at least two parts. A first adder circuit in the invention handles even numbered data phases and a second adder circuit handles odd numbered data phases.

The disclosed circuit interleaves two adder circuits, such that each individual dual adder circuit handles every other data phase. Interleaving two adders allows each adder circuit to process the information over two clock cycles instead of one clock cycle. The additional processing time for each adder allows higher bus speeds to be achieved using lower cost, slower components.

A counter circuit monitors the total number of data phases transferred. Maintaining a count of the total number of data phases transferred allows the dual adders to handle different disconnects that occur and appropriately handle any different conditions which may arise when transmission of the burst data is resumed. These conditions include possible changes in data transfer sizes.

BRIEF DESCRIPTION OF THE DRAWINGS

The advantages of the present invention will become more readily apparent to those ordinarily skilled in the art after reviewing the following detailed description and accompanying drawings, wherein:

FIG. 1 is a system overview of the burst control monitoring circuit used in a general PCI interface.

DETAILED DESCRIPTION OF THE INVENTION

Figure 2A:
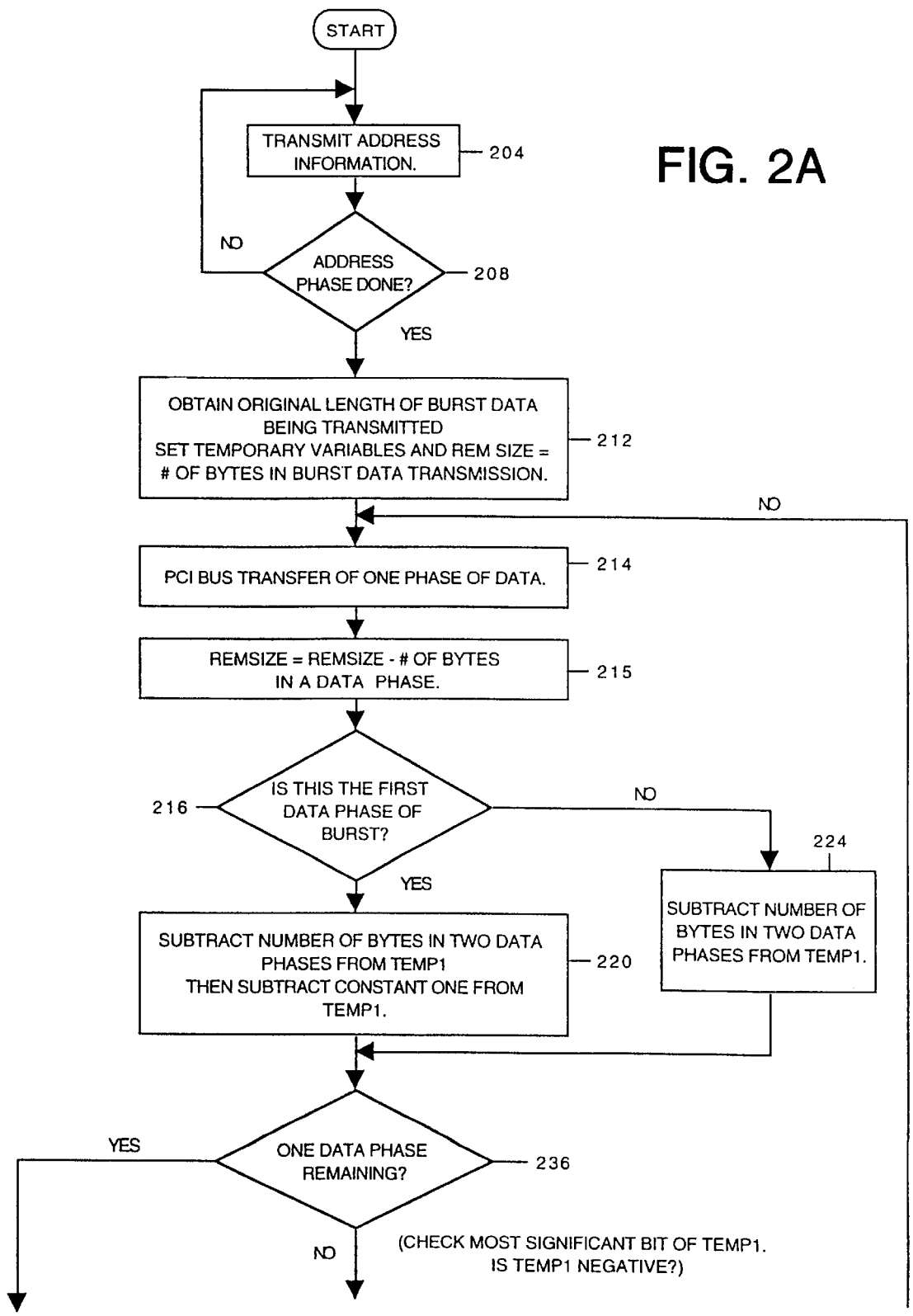
FIGS. 2A & 2B are flow charts indicating the processes implemented by the circuit when no interrupts are asserted.

FIG. 1 shows the overall system which incorporates a burst control monitoring (BCM) circuit. The BCM circuit 100 is part of a larger overall PCI interface logic 104. The PCI interface logic 104 and a I/O bus 106 provides a communication mechanism between an application hardware 108 and other systems 110. The communications between the application hardware and other systems are transmitted through the PCI interface logic 104. The BCM circuit 100 further includes a first dual adder circuit 112, a second dual adder circuit 116 and a counter circuit 120. These three circuits 112, 116, 120 track how much data has been transferred in a burst and issue signals when a burst data transfer is approaching completion.

Figure 2B:
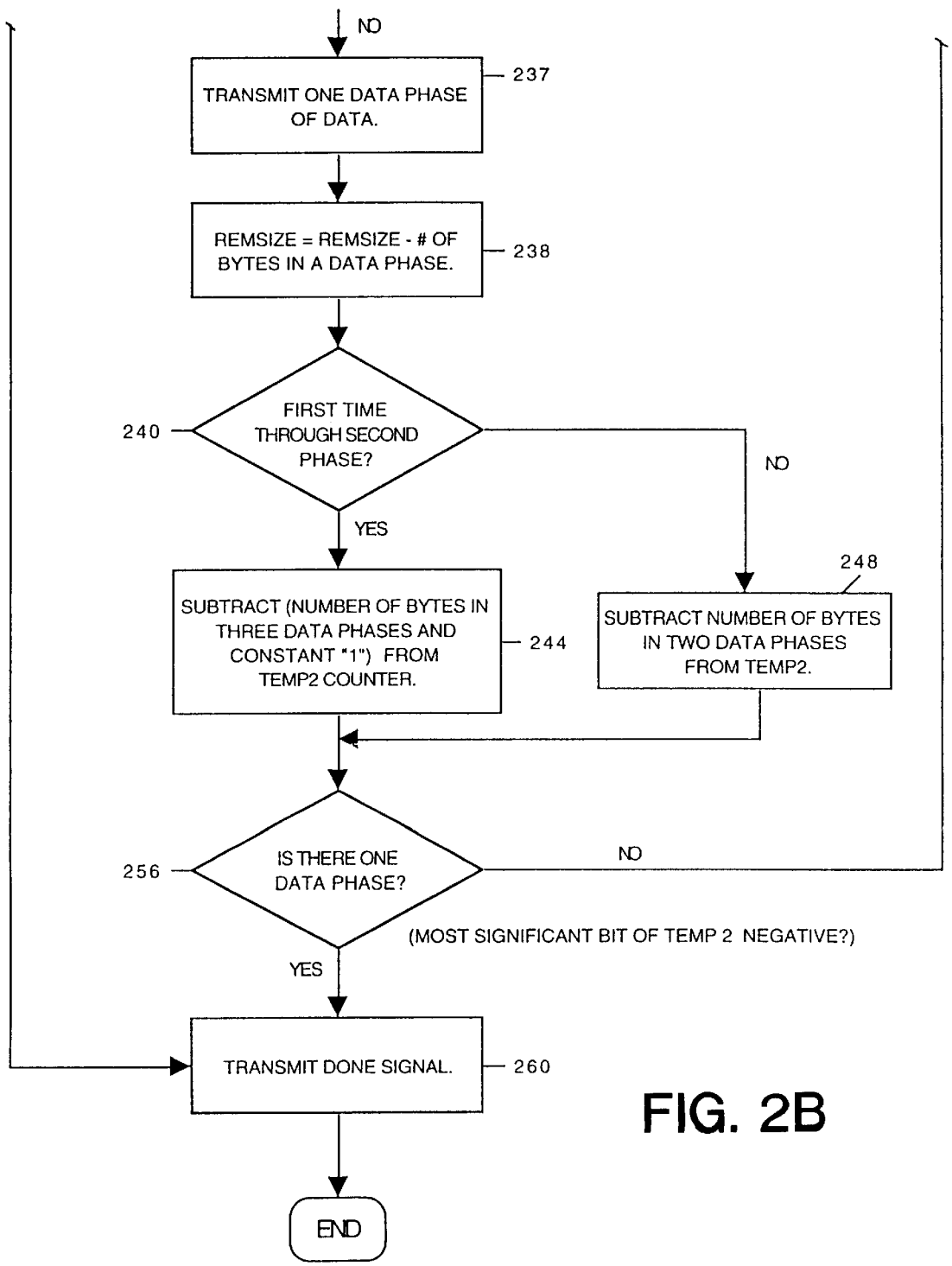

FIGS. 2A and 2B are flow charts 200 of the operation of the BCM circuit. Initially the PCI bus is in an idle mode. At the start of a data transfer, address information is transmitted during an address transmission phase (step 204). This continues until the address transmission phase is completed (step 208). Thirty-two-bit addresses require a single clock address phase while 64 bit addresses require two clock phases to complete.

After the address transmission phase is completed, the data portion of the burst transmission takes place. REM-SIZE represents the amount of data which remains to be transmitted and TEMP1 and TEMP2 are temporary counters. TEMP1 and TEMP2 are internal variables generated by the first dual adder circuit and the second dual adder circuit respectively. REM-SIZE is a variable generated by the counter circuit. All three variables are used by the respective circuits to indicate how many data phases remain to be transferred. All three variables are initially set to ORIG-SIZE, the number of data bytes in the burst transmission (step 212).

The PCI circuit transfers the data corresponding to the first data phase from the master to the target (step 214). The counter circuit decrements the variable REM-SIZE to reflect the transfer (step 215). The dual adder circuits track the first data phase of a burst differently than subsequent data phase (step 216). Likewise the first data phase after a disconnect is also treated differently than subsequent data phases. In the first data phase, the number of bytes in two data phases (8 bytes in a 32-bit transfer and 16 bytes in a 64-bit transfer) are subtracted from the temporary variable TEMP1 (step 220). Additionally, TEMP1 is decremented by one to ensure that TEMP1, which tracks how much data has been transmitted, will have a negative value prior to the time when the last data phase of a burst has been completed.

The constant "one" should only be subtracted out once (on the first data phase), thus subsequent data phases will merely subtract the number of bytes in two data phases from TEMP1 (step 224).

After the PCI master and target have completed a data transfer, the first dual adder circuit reduces TEMP1 by an appropriate value. The counter circuit reduces REM-SIZE by the number of bytes in a data phase (step 232) (four in a 32-bit data transfer, eight in a 64-bit data transfer).

If only one data phase remains in the burst, a DONE signal is issued 260. Otherwise, the PCI circuit transfers the next set of data corresponding to the next data phase, step 237 and the counter circuit decrements REM-SIZE accordingly (step 238). A second dual adder circuit interleaved in time with the first dual adder circuit handles the second and future even numbered data phases.

The second dual adder circuit handles the second set of data following the start of a data burst differently than subsequent even numbered data phases. The second data phase of a burst (the first data phase handled by the second dual adder circuit) results in TEMP2, which initially contains the byte size of the original burst transmission, being reduced by the number of bytes in three data phases. TEMP2 is further reduced by one to ensure that it will turn negative one data phase prior to the end of a burst. (Step 244). In subsequent even data phases of the burst, TEMP2 is reduced by the number of bytes in two data phases (8 in a 32 bit transfer, 16 in a 64 bit transfer).

If after an even numbered data phase, only one data phase remains to be transmitted in a burst, (detected by determining whether TEMP2 is positive or negative, which is determined by checking the most significant bit (step 256) then a DONE signal is issued. (step 260). Otherwise, the system loops back to handle the next set of data phase transmissions.

Figure 3:
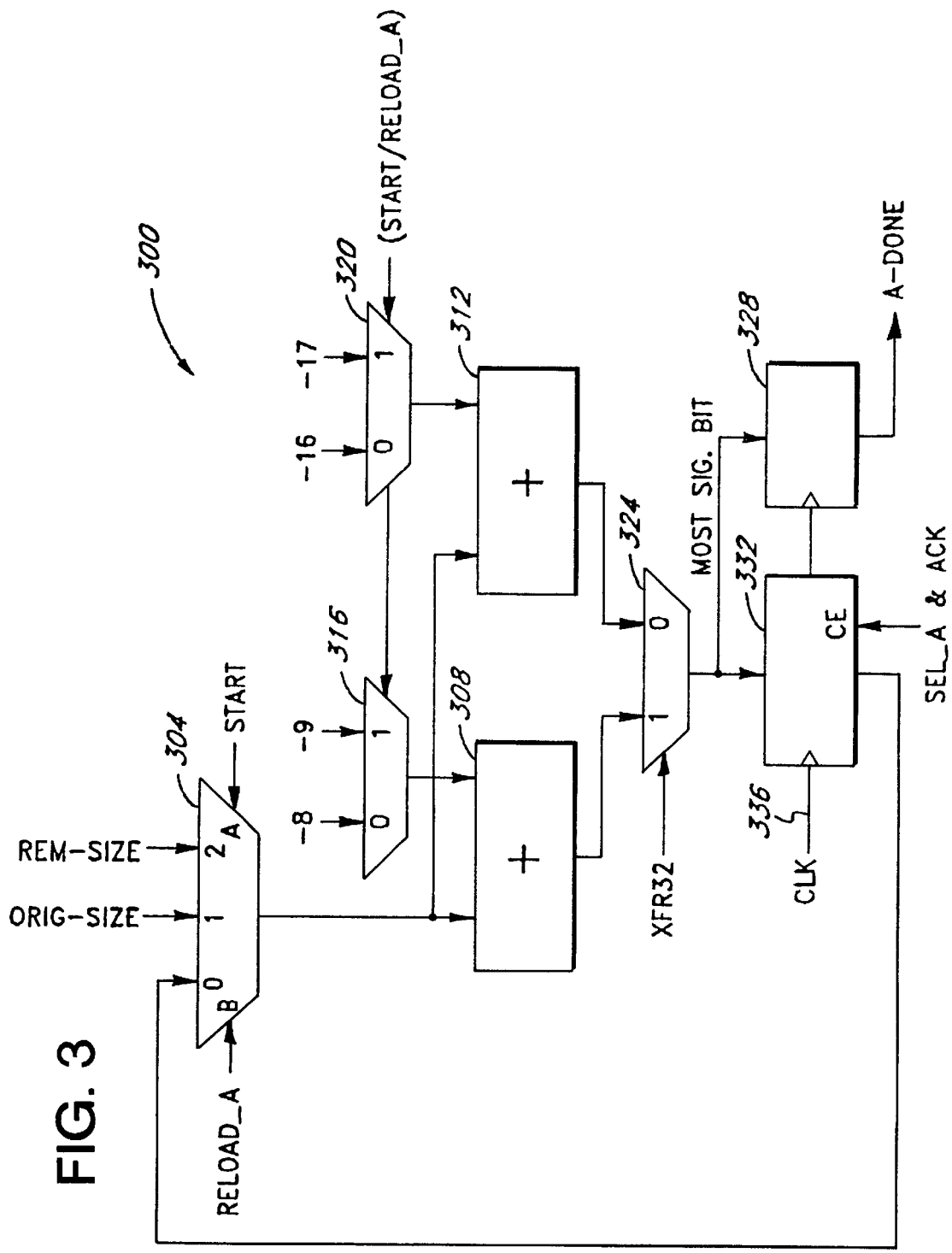
FIG. 3 is a block diagram of the first dual adder circuit used in one implementation of a burst control monitoring circuit.

FIG. 3 illustrates a first adder circuit 300 used in the BCM circuit 100 of FIG. 1. The first adder circuit 300 tracks the amount of data transmitted and issues the DONE signal if after an odd numbered data phase only one data phase remains.

The START and RELOAD_A signals on the select lines of a multiplexer 304 determine whether the data set is the first of a burst. The appropriate input to the first dual adder circuit is chosen accordingly. Initially, START will be asserted and ORIG-SIZE representing the size of the data burst will be loaded. Subsequently, feedback values which track the data remaining to be transferred in a burst will be input into the adder. If a data transmission is interrupted due to a disconnect, RELOAD_A will be asserted resulting in REM-SIZE being input. REM-SIZE, which is generated by a third circuit, indicates the number of bytes remaining to be transferred in a data burst.

The output from multiplexer 304 is input into two adders 308, 312. The first adder 308 process information if a 32 bit transfer is occurring, the second adder 312 process information if a 64 bit transfer occurs. The information added to the output of multiplexer 304 by the first adder 308 and second adder 312 is the output of first multiplexer 316 and second multiplexer 320 respectively. In the first data phase transmission of a burst, START will be asserted resulting in the input into each adder 308, 312 of the negative of the number of bytes in two data phases plus negative one. The negatives turn the addition done by the adders 308, 312 into a subtraction. The negative one assures that a negative number will be generated by the adders 308, 312 one data phase before the last data phase. Likewise, if the signal is the first data phase being processed after a disconnect, the RELOAD_A is asserted. Asserting RELOAD_A produces the same result as the assertion of START (the result being an additional 1 subtracted by the adders). In all other data phases, the number of bytes of data transferred in two data phases is subtracted from the output of multiplexer 304 by the adders 308, 312.

The output of the adders 308, 312 are both input into a multiplexer 324 which selects which adder output to use depending on whether a 32-bit transfer is occurring (XFR32 high and output of the first adder 308 is selected) or a 64-bit transfer is occurring (XFR32 low and output of the second adder 312 is selected).

The output of multiplexer 324 is input into a register 322 which is clocked by a clock signal 336. The clock enable of the register is controlled by SEL_A which is asserted when the first adder circuit 300 is operating on an odd numbered data phase SEL_A is logically anded with ACK which itself is asserted when IRDY# is asserted and TRDY# is asserted.

The most significant bit (the sign bit of TEMP1) of the signal output from the multiplexer 324 is stored in a second register 328 and provides a DONE signal.

Figure 4:
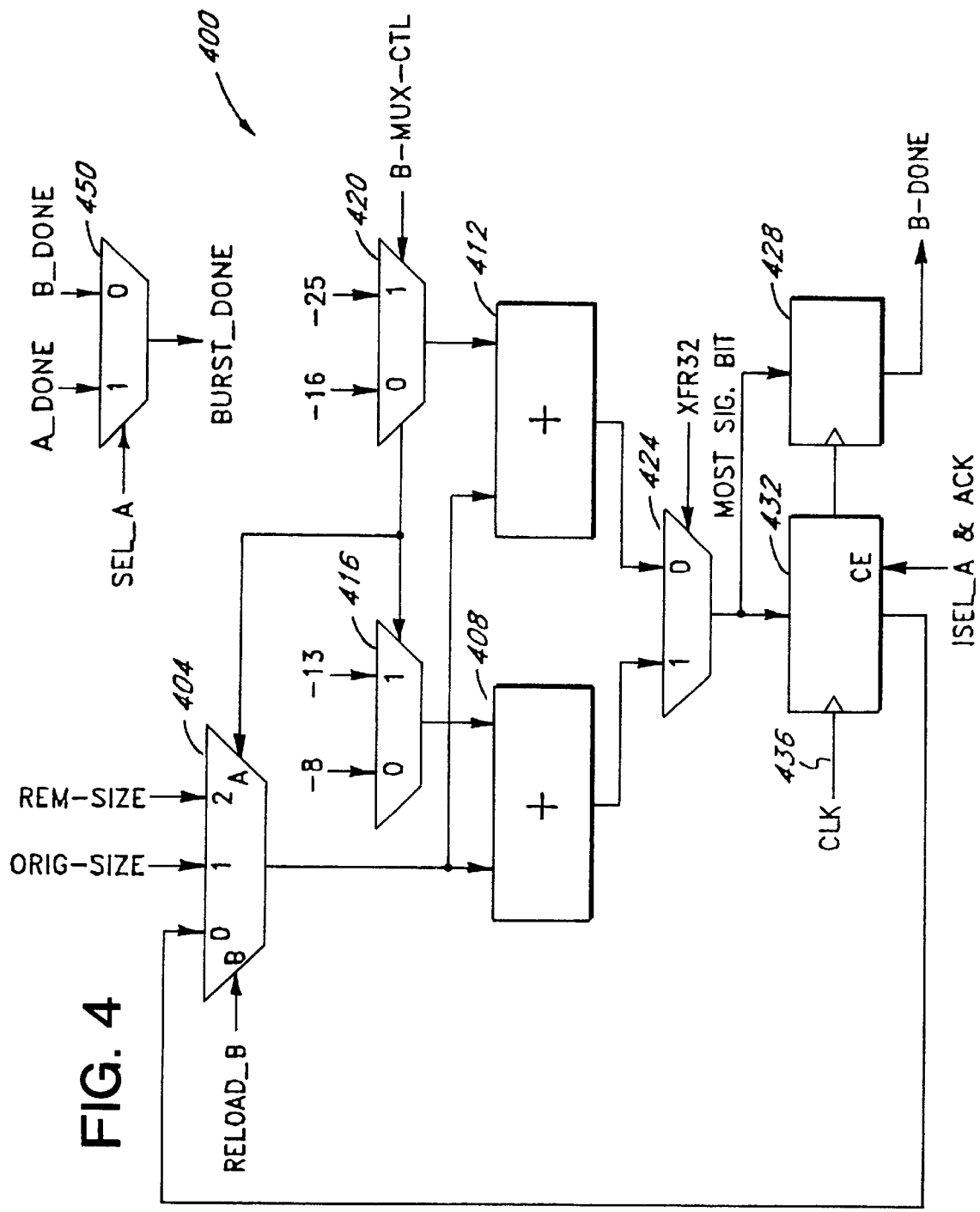
FIG. 4 is a block diagram of the second dual adder circuit used in one implementation of a burst control monitoring circuit.

FIG. 4 illustrates in a block diagram form a second parallel adder 400 which is used in one embodiment of the BCM circuit. The operation of the second dual adder circuit 406 is very similar to the operation of the first parallel adder circuit 300.

A multiplexer 404 in the second dual adder circuit 400, chooses whether to input REM-SIZE, ORIG-SIZE or TEMP2 based on whether the data is (1) the second data phase of a burst, (2) the second data phase since a disconnect, or (3) a subsequent data phase. (Note that upon initialization, the first data phase processed by the second dual adder circuit is the actual second data phase in the burst because the second adder circuit only processes even data phases.)

The output of multiplexer 404 is input into a third adder 408 and a fourth adder 412. These two adders 408, 412 combine the output from multiplexer 404 with the output from a third multiplexer 416 and a fourth multiplexer each 420 respectively. The third multiplexer 416 and the fourth multiplexer each select the appropriate value to add to the input value depending on whether the data is the first data of a burst or subsequent data. The third adder/multiplexer 416 combination tracks 32-bit data transfers and the fourth adder/multiplexer combination is responsible for tracking 64-bit data transfers.

A different number is subtracted from the multiplexer 404 output TEMP2 during the first data phase processed by the second dual adder circuit 400 than in subsequent even data phases. The processing of the second data phase must account for (1) the fact that one data phase has already been processed by the first adder circuit 300 and (2) TEMP2 must be further reduced by 1 to ensure that the output of the adders 404, 412 is negative at the end of the data burst. Thus on the second data phase, the adders 408, 412 subtract from TEMP2 the number of bytes contained in three data phases, and then further reduce TEMP2 by one. In subsequent data phase cycles, TEMP2 is reduced by the number of bytes transferred in two data phases.

Output multiplexer 424 outputs the appropriate signal from the two adders 408, 412. The output chosen depends on whether 32 bit transfers or 64 bit transfers are being executed. The output of the output multiplexer (TEMP2) is stored in register 432 which is timed by clock 436. The most significant (or sign) bit of TEMP2 is transmitted to register 428 and used to signal when only one data phase before final remains.

A final multiplexer 450 takes the output from the first adder circuit 300 (A_DONE which is the sign bit of TEMP1) and the output of the second adder circuit 400 (B_DONE which is the sign bit of TEMP2) and outputs a DONE signal based on whether SEL_A is asserted or deasserted. Whether SEL_A is asserted depends on which adder circuit is processing data at a particular clock cycle.

Figure 5:
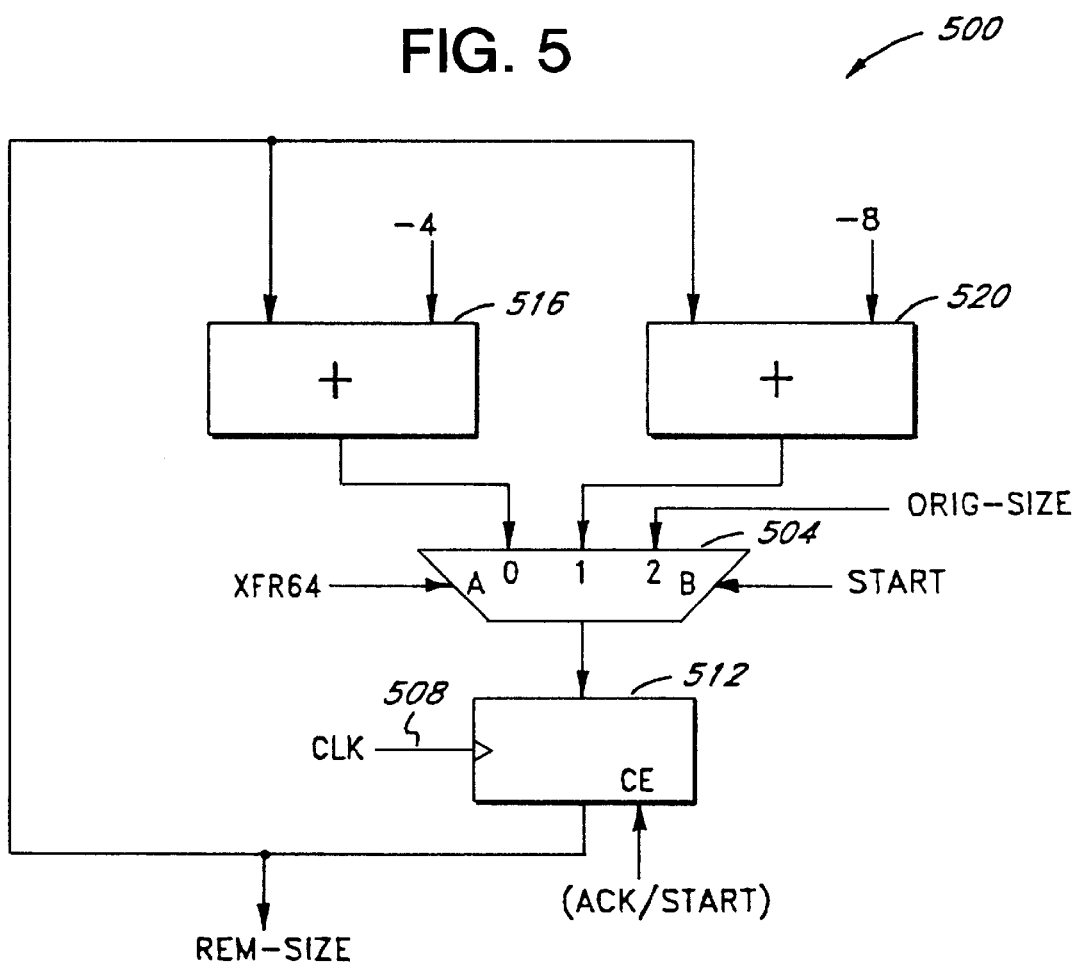
FIG. 5 is a block diagram of a counter circuit used to track the number of bytes which remain to be transmitted in a burst.

FIG. 5 is a counter circuit 500 that outputs REM-SIZE which indicates how many bytes of data in a burst remain to be transferred. If the circuit is interrupted due to a disconnect, and needs to resume data transmission at a later time, REM-SIZE allows the circuit to resume in the state affiliated with the next phase data burst to be completed.

The size of the original burst transfer is input into a multiplexer 504. This data is output from the multiplexer when START is asserted. Each clock 508 cycle, counter register 512 sends the counter multiplexer 504 output, REM-SIZE, to a first counter adder 516, and a second counter adder 520.

The first counter adder 516 handles 32 bit transfers and subtracts the number of bytes transferred in one data phase (four bytes) from the number of bytes remaining to be transferred given by REM-SIZE.

The second counter adder, 520 handles 64 bit transfers and subtracts the number of bytes transferred in one data phase of a 64 bit transfer (eight bytes) from the number of bytes remaining to be transferred given by REM-SIZE.

Which adder output represents the remaining bytes to be transferred (next state REM-SIZE) is selected by counter multiplexer 504. The counter multiplexer output is based on whether a 32 bit transfer or a 64 bit transfer is occurring as specified by signal XFR 64 which is asserted in a 64 bit transfer and deasserted in 32 bit transfers. The output signal REM-SIZE is input into the dual adder circuits 300 and 400 in the event a disconnect makes it necessary to restart the circuits.

Figure 6:
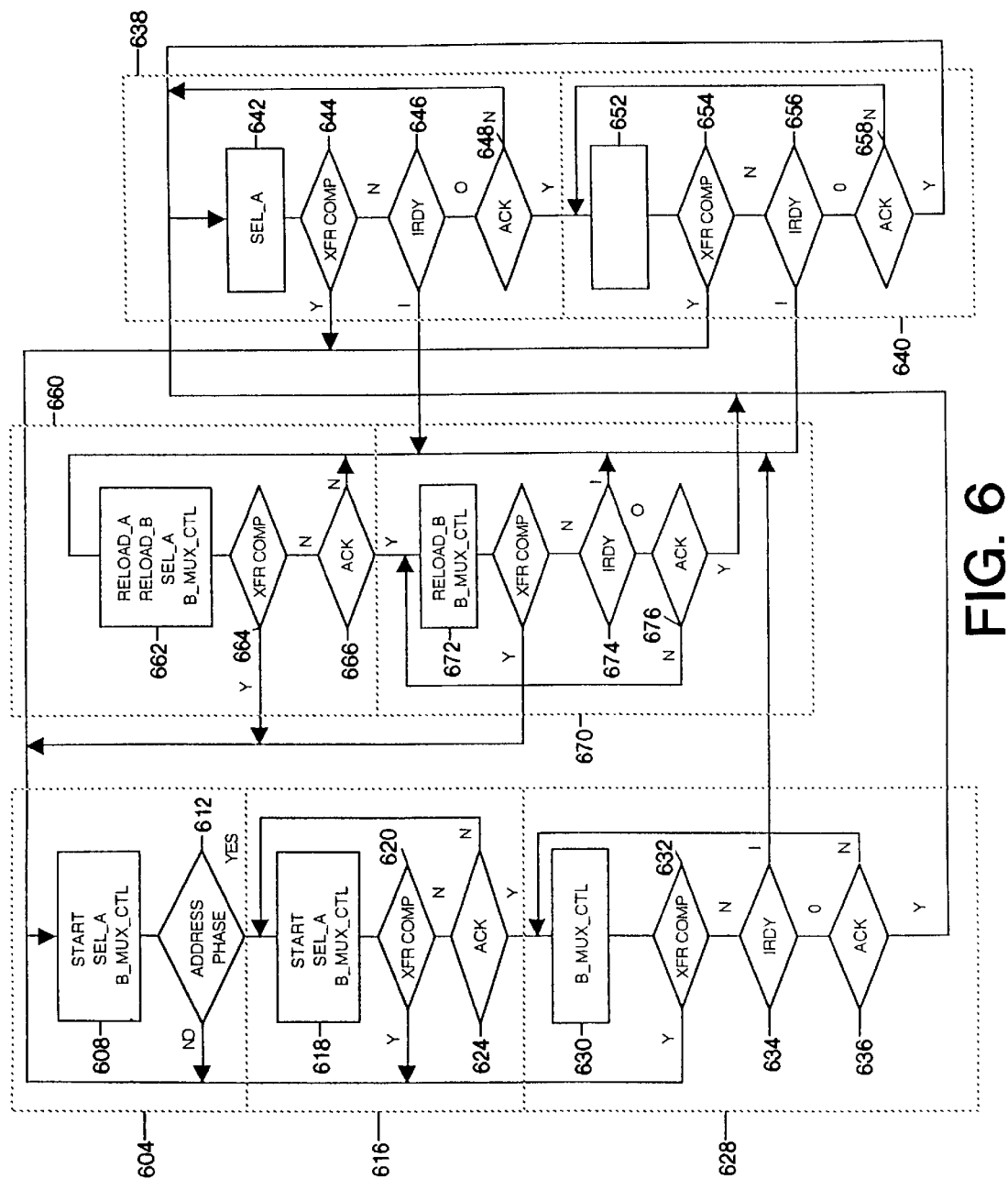
FIG. 6 is a state diagram of the circuitry which supports the burst control monitoring circuit pictured in FIGS. 3–5.

FIG. 6 is a state machine diagram 600 of a supporting circuit which supports the adder and counter circuits shown in FIGS. 4–6. The supporting circuit outputs (which are input into the dual adder and counter circuits 300, 400, 500) are shown in boxes. The values listed in the boxes are signals which are asserted. Inputs into the supporting circuit which result in different actions taken by the supporting circuit are shown in diamonds.

In the address phase 604, START, SEL_A and B_MUX_CTRL are asserted 608 until the address phase is completed 612. Once the address phase is completed and through the transfer of the first phase of data 616; START, SEL_A and B_MUX_CTRL remain asserted 618. As long as XFR COMP is not asserted 620 by external supporting logic indicating all data in a burst has been transmitted, and when ACK is asserted 624 (indicating the first phase is completed), the second dual adder circuit will process the second data phase.

During the processing 628 of the second data phase, $B_{13}$ MUX_CTRL is asserted 630. If the data set is not the last in the burst, XFR COMP is not asserted by supporting logic. If XFR COMP is asserted, all the data in the burst has been transmitted, and the circuit returns to a wait state or address phase 604.

IRDY# deasserted (IRDY#=1) indicates a disconnect. If a disconnect occurs, IRDY# is deasserted and the circuit performs the necessary counter update activities. The circuit stays in the processing of the second data phase 628, until ACK, 636 which in a combination of IRDY# low and TRDY# low indicates that the second data phase has just been completed.

Once ACK indicates the second data phase has been completed, subsequent data phases of the state machine outputs and inputs are dictated by sequence 638 for odd number data phases and sequence 640 for even numbered data phases. To begin processing of odd numbered data phases, SEL_A is asserted 642 during the operation of the first dual adder circuit. The supporting circuit continues to check for end of the burst 644, disconnects 646 and end of the data phase 648 signals.

After odd data phases in which XFR COMP, IRDY#, and ACK are not asserted, even data phases are processed by sequence 640 in which no signals are initially asserted 642. Again, the supporting circuit continues to remain in sequence 640 unless end of the data burst signal (XFR COMP) 654, disconnect signal (IRDY#) 656 or the end data phase signal (ACK) 658 is asserted. Assertion of ACK takes the state machine to sequence 638 to process the next even numbered data phase. Assertion of the DONE signal in either the even processing sequence 638 or the odd processing sequence 640 will result in the signal returning to the initial idle state and awaiting the input of the next address sequence. 604.

A target initiated disconnect anywhere in the processing chain returns take the state machine circuit out of the processing sequence to handle the disconnect sequence. When the circuit returns to process further data the state machine returns to a disconnect handle sequence 660 similar to that of the initial start up state sequences 616, 628. In the handle disconnect sequence 660 RELOAD_A, RELOAD_B, SEL_A and B_MUX_CTRL are asserted. 662. As long as the burst transfer is not complete (XFR COMP asserted) 664 and ACK is not asserted 666, first adder in FIG. 3 continues processing of the odd numbered data phase.

When ACK is asserted, the second half 670 of the disconnect handling sequence 660 of the state machine operates to initialize the even numbered data phase on restart. RELOAD_ and B_MUX_CTRL are asserted 672 during the handling of the first even numbered data phase after a disconnect. Processing of the first even numbered data phase after a disconnect continues as long as XFR COMP is not asserted 674 and IRDY# is not asserted. Once ACK is asserted indicating completion of the second data phase after the disconnect, the circuit returns to handling subsequent data in the steady state sequences 638, 640.

This process continues until a XFR COMP is asserted and the state machine returns to its idle state 604.

Figure 7:
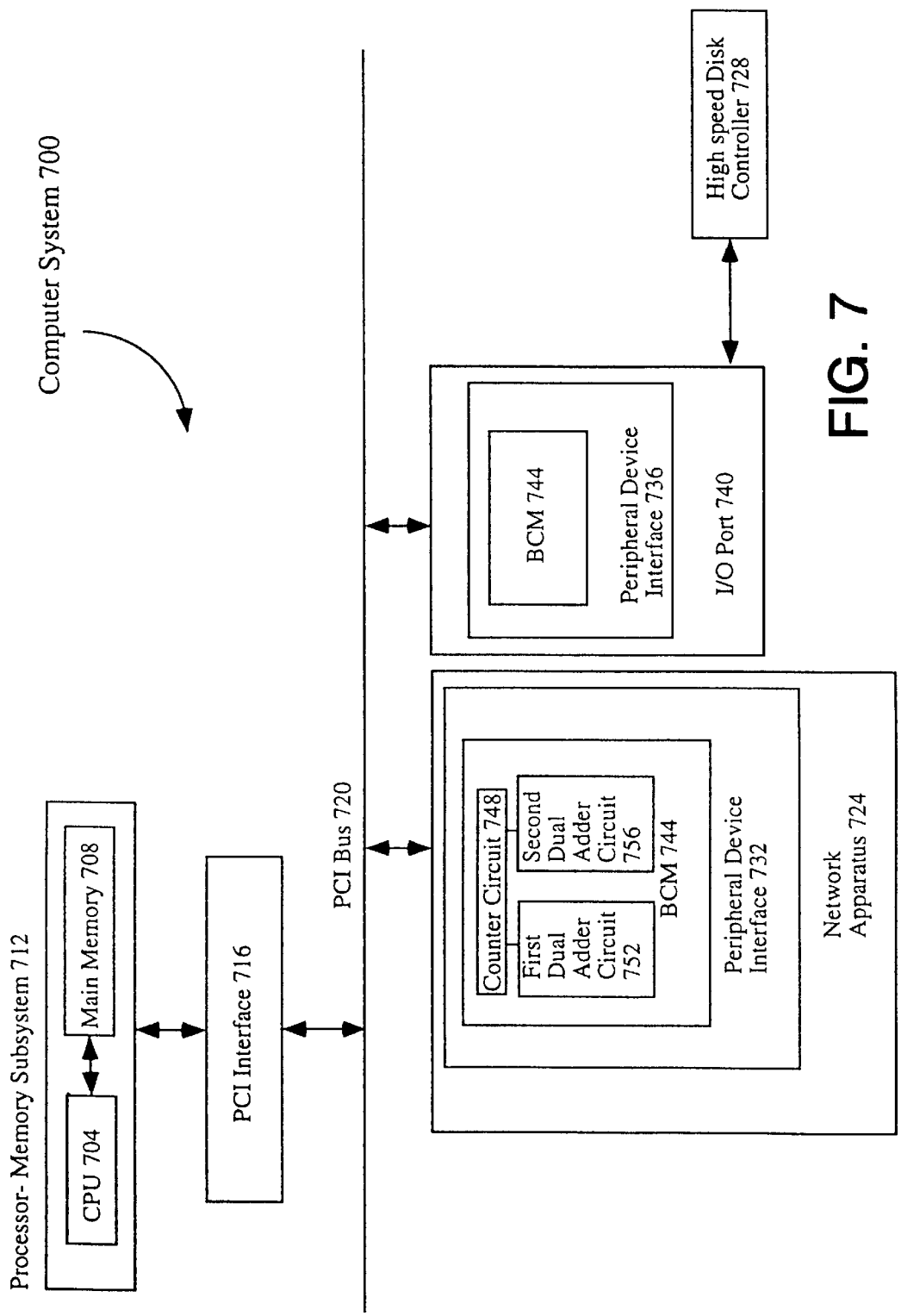
FIG. 7 is a block diagram of a computer system including the burst control monitoring circuit pictured in FIGS. 3–5.

FIG. 7 shows the BCM circuit implemented in a computer system 700. The computer system 700 includes a central processing unit (CPU) 704 coupled to a memory device 708. The CPU-Memory subsystem 712 provides signals in an original format to a PCI interface 716 which converts the signals into a transmission format such as a PCI format for transmission on a PCI bus 720.

The PCI bus 720 communicates the signals to peripheral devices such as network apparatus 724 and high speed disk controllers 728. The peripherals may include a PCI peripheral device interface 732, 736 which converts the PCI format signals into a peripheral format suitable for peripheral device use. (High speed disk controller 728 is connected via an input/output port 740 which already includes the needed PCI peripheral device interface circuitry).

The PCI peripheral device interface 732, 736 includes the BCM circuitry 744 for issuing a DONE signal when a burst transmission of PCI data is about to terminate. The BCM circuitry 744 includes a counter circuit 748, a first dual adder circuit 752 and a second dual adder circuit 756. The counter circuit 748 tracks how many bytes remain to be transferred in a data burst. The first dual adder circuit 752 monitors odd numbered data phases while the second dual adder circuit 756 monitors even numbered data phases. A done signal is issued when either the first dual adder circuit or the second dual adder circuit determines that a burst transmission is about to end.

The present invention described herein may be designed in many different methods and using many different configurations. While the present invention has been described in terms of various embodiments, other embodiments may come to mind to those skilled in the art with departing from the spirit and scope of the present invention. The invention should therefore be measured in terms of the claims which follow.

What is claimed:

1. A burst control circuit for controlling termination of a bus input/output, said burst control circuit comprising:
    a first dual adder circuit configured to transmit a first done signal indicating if a burst transfer is within two data phases of completion in even numbered data phases; and
    a second dual adder circuit configured to send a second done signal indicating if a burst transfer is within two data phases of completion in odd numbered data phases.

2. The burst control circuit of claim 1 wherein said burst control circuit further comprises a multiplexer which selects either said first done signal or said second done signal.

3. The burst control circuit of claim 1 further comprising a remaining byte count circuit configured to input into said first dual adder circuit and said second dual adder circuit the number of bytes in a burst which remain to be transferred.

4. The burst control circuit of claim 1 wherein said first dual adder circuit further comprises:
    a first adder configured to process 32 bit data transfers;
    a second adder configured to process 64 bit data transfers.

5. The burst control circuit of claim 4 wherein said second adder further comprises:
    a third adder configured to track 32-bit data transfers during even numbered data phases;
    a fourth adder configured to track 64-bit data transfers during odd numbered data phases.

6. The burst control circuit of claim 1 further comprising:
    an input multiplexer configured to select an input to the first adder circuit based on whether a received signal is a continuation of a previously disconnected burst.

7. A computer system comprising:
    a central processing unit coupled to a memory and configured to output a processed signal in an original format;
    a first interface for converting said processed signal from the original format into a transmission format;

a bus configured to receive and communicate the processed signal in the transmission format;

a peripheral device including a second interface circuit, said second interface circuit converts said processed signal in the transmission format into a peripheral format appropriate for use by said peripheral device; said second interface circuit including a burst control monitor circuit configured to issue a final done signal when a data burst is about to terminate, said burst control circuit further comprising:

a counter circuit which tracks the number of bursts remaining to be transmitted;

a first dual adder circuit which monitors odd numbered data phases and issues a first done signal when the data burst is within two data phases of termination; and a second dual adder circuit which monitors even numbered data phases and issues a second done signal when the data burst is within two data phases of termination.

8. The computer system of claim 7 wherein said bus is a PCI bus.

9. The system of claim 7 wherein said burst control monitor circuit is configured such that said counter circuit provides said first dual adder circuit a number of bytes remaining to be transferred in a data burst after a disconnect.

10. The computer system of claim 7 wherein said second interface further includes a support circuit which provides state signals for said first dual adder circuit and said second dual adder circuit.

11. The computer system of claim 7 wherein said transmission format is a PCI format.

12. A method of indicating when a data burst including data phases, is about to be completed, said method comprising the step of:

initializing a first variable and a second variable;

during data phase transmission, reducing said first variable by a number of bytes transmitted in two of said data phases every odd numbered clock cycle after initializing said first variable;

during said data phase transmission, reducing said second variable by the number of bytes transmitted in two of said data phases every even numbered clock cycle after initializing said second variable, determine when the data burst is within two data phases of completion.

13. The method of claim 12 wherein a most significant bit of said first variable and a most significant bit of said second variable is used to determine when the data burst is within two data phases of completion.

14. The method of claim 12 wherein said initialization comprises:

setting said first variable and said second variable to a value equal to the number of bytes in said data burst;

during a first data phase reducing said first variable by the number of bytes transmitted in two of said data phases and then further reducing said first variable by one;

during a second data phase reducing said second variable by a number of bytes transmitted in three of said data phases and then further reducing said second variable by one.

15. The method of claim 12 wherein the number of bytes transmitted in two data phases is eight.

16. The method of claim 12 wherein the number of bytes transmitted in two data phases is sixteen.

17. The method of claim 12 wherein the number of bytes in a data phase transmitted before a disconnect is different from the number of bytes in data phases after the disconnect.

18. The method of claim 12 wherein within said first variable and said second variable are used to determine when the data burst is completed.

* * * * *